C. L. REDFIELD.
VEHICLE WHEEL.
APPLICATION FILED APR. 9, 1913.
1,113,577.
Patented Oct. 13, 1914.
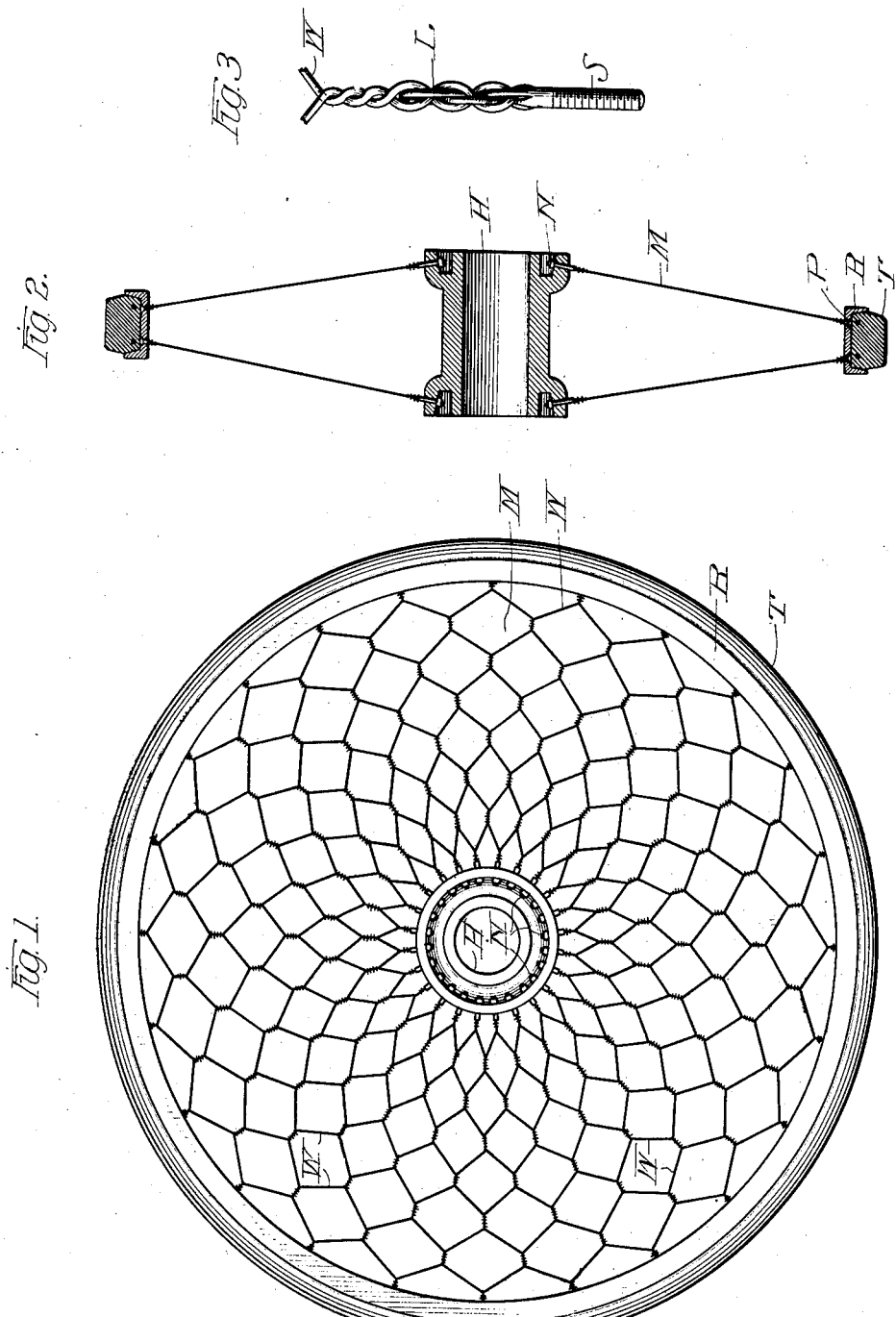

UNITED STATES PATENT OFFICE.

CASPER L. REDFIELD, OF CHICAGO, ILLINOIS.

VEHICLE-WHEEL.

1,113,577.  Specification of Letters Patent.  Patented Oct. 13, 1914.

Application filed April 9, 1913. Serial No. 759,880.

*To all whom it may concern:*

Be it known that I, CASPER L. REDFIELD, a citizen of the United States of America, and a resident of Chicago, county of Cook, and State of Illinois, have invented certain new and useful Improvements in Vehicle-Wheels, of which the following is a specification.

My invention relates to wheels for vehicles and has for its object improvements in devices of that kind.

In the accompanying drawings Figure 1 is an elevation; Fig. 2 is a transverse section; and Fig. 3 is an enlarged detail of the terminal twists.

The rim R, which holds the tire T, is connected to the hub H by two disks of woven wire meshes M. The mesh is preferably what is known as "diamond mesh" with the relative proportions of the diamonds changing according to their radial distance from the center of the hub. The diamonds are formed by twisting adjacent wires W together as shown in the upper part of Fig. 3.

The inner and outer terminal twists each have inserted therein a locking wire L, the ends of which are bent back and forth between each half twist. The ends, consisting of four wires, are then welded together and provided with screw threads S. Nuts N are applied to put the mesh under tension. Similar nuts may be applied to the twist terminals at both the hub and rim, or permanent riveted connections may be made at one of these points as shown at P. If spring wire be used for the mesh, and the twists be made with the wires under moderate tension, the nuts N may be tightened to make the mesh as tight as a drum head, and the mesh will be capable of yielding still further to make the wheel resilient in use.

What I claim is—

1. A wire mesh in the form of a disk, said mesh being formed by twisting adjacent wires together, and each wire extending from the center to the circumference of the disk.

2. The combination with an outer ring, and an inner ring, of wires extending from the inner ring to the outer ring, said wires being twisted together to form a mesh connecting the rings.

3. The combination with an inner ring, and an outer ring, of wires extending from the inner ring to the outer ring and twisted together to form a mesh connecting the rings, and means for adjusting the tension of said mesh.

4. In a woven wire mesh, the combination with the terminal twists of the wire, of a locking wire inserted in each twist and extending through several turns thereof.

5. In a woven wire mesh adapted to be placed under tension, the combination with the terminal twists of the wire, of a locking wire inserted in each twist, the wires of the twist and the locking wire being welded together to form means for connecting the mesh for placing it under tension.

6. A wire disk provided with attaching means for placing the disk under desired radial tension.

7. A woven wire disk formed by twisting adjacent wires together to form a mesh, the terminal twists of which mesh extend radially and are provided with means for attaching at circularly arranged points.

8. The combination with inner and outer rings, of a twisted wire mesh connecting the rings, said mesh having terminals at one ring provided with screw threads, and nuts on said terminals whereby the tension of different parts of the mesh may be independently adjusted.

Signed at Chicago, Illinois, this 7th day of April, 1913.

CASPER L. REDFIELD.

Witnesses:
J. W. JEWSON,
WALTER H. REDFIELD.